(12) United States Patent
Kalwitz et al.

(10) Patent No.: US 8,074,105 B2
(45) Date of Patent: Dec. 6, 2011

(54) HIGH DATA AVAILABILITY SAS-BASED RAID SYSTEM

(75) Inventors: George Alexander Kalwitz, Mead, CO (US); Victor Key Pecone, Lyons, CO (US)

(73) Assignee: Dot Hill Systems Corporation, Longmont, CO (US)

( * ) Notice: Subject to any disclaimer, the term of this patent is extended or adjusted under 35 U.S.C. 154(b) by 1093 days.

(21) Appl. No.: 11/868,830

(22) Filed: Oct. 8, 2007

(65) Prior Publication Data
US 2009/0094620 A1 Apr. 9, 2009

(51) Int. Cl.
*G06F 11/00* (2006.01)
(52) U.S. Cl. .......... 714/6.22; 714/4.1; 714/4.2; 714/11; 711/114; 711/164; 709/224
(58) Field of Classification Search ................. 714/6.22, 714/4.1, 4.2, 11; 711/114, 164; 709/224
See application file for complete search history.

(56) References Cited

U.S. PATENT DOCUMENTS

| | | | | |
|---|---|---|---|---|
| 8,024,773 B2 * | 9/2011 | Butler et al. | ...................... | 726/1 |
| 2007/0070885 A1 * | 3/2007 | Uddenberg et al. | ........... | 370/225 |
| 2007/0100847 A1 * | 5/2007 | Slutz et al. | .................... | 707/100 |
| 2007/0165660 A1 * | 7/2007 | Fang et al. | ..................... | 370/410 |
| 2007/0220204 A1 * | 9/2007 | Nakajima et al. | ............. | 711/114 |
| 2008/0005470 A1 * | 1/2008 | Davies | ........................... | 711/114 |
| 2008/0010530 A1 * | 1/2008 | Davies et al. | .................... | 714/31 |
| 2008/0126631 A1 * | 5/2008 | Bailey et al. | ..................... | 710/74 |
| 2008/0126849 A1 * | 5/2008 | Kotzur et al. | ...................... | 714/7 |
| 2008/0126851 A1 * | 5/2008 | Zadigian et al. | .................. | 714/7 |
| 2009/0083484 A1 * | 3/2009 | Basham et al. | ................. | 711/114 |
| 2010/0049919 A1 * | 2/2010 | Winokur et al. | ............... | 711/114 |
| 2010/0064348 A1 * | 3/2010 | Matsumoto et al. | ............. | 726/4 |

* cited by examiner

*Primary Examiner* — Scott Baderman
*Assistant Examiner* — Loan L. T. Truong
(74) *Attorney, Agent, or Firm* — Thomas J. Lavan; E. Alan Davis

(57) ABSTRACT

A storage system includes two RAID controllers, each having two SAS initiators coupled to a zoning SAS expander. The expanders are linked by an inter-controller link and create a SAS ZPSDS. The expanders have PHY-to-zone mappings and zone permissions to create two distinct SAS domains such that one initiator of each RAID controller is in one domain and the other initiator is in the other domain. The disk drives are dual-ported, and each port of each drive is in a different domain. Each initiator can access every drive in the system, half directly through the local expander and half indirectly through the other RAID controller's expander via the inter-controller link. Thus, a RAID controller can continue to access a drive via the remote path in the remote domain if the drive becomes inaccessible via the local path in the local domain.

25 Claims, 8 Drawing Sheets

Fig. 4 controller A — 400A

| | logical PHY | zone group ID |
|---|---|---|
| to port A of drives A 106A | 0 | 1 |
| | 1 | 1 |
| | 2 | 1 |
| | 3 | 1 |
| | 4 | 1 |
| | 5 | 1 |
| to port A of drives B 106B | 6 | 2 |
| | 7 | 2 |
| | 8 | 2 |
| | 9 | 2 |
| | 10 | 2 |
| | 11 | 2 |
| to inter-controller link | 12 | 127 |
| | 13 | 127 |
| | 14 | 127 |
| | 15 | 127 |
| to initiator B | 16 | 2 |
| | 17 | 2 |
| | 18 | 2 |
| | 19 | 2 |
| to expander A of expansion chassis A | 20 | 2 |
| | 21 | 2 |
| | 22 | 2 |
| | 23 | 2 |
| to initiator A | 24 | 1 |
| | 25 | 1 |
| | 26 | 1 |
| | 27 | 1 |
| to expander A of expansion chassis B | 28 | 1 |
| | 29 | 1 |
| | 30 | 1 |
| | 31 | 1 |
| un-connected | 32 | 0 |
| | 33 | 0 |
| | 34 | 0 |
| | 35 | 0 | controller B — 400B

| | logical PHY | zone group ID |
|---|---|---|
| to port B of drives A 106A | 0 | 2 |
| | 1 | 2 |
| | 2 | 2 |
| | 3 | 2 |
| | 4 | 2 |
| | 5 | 2 |
| to port B of drives B 106B | 6 | 1 |
| | 7 | 1 |
| | 8 | 1 |
| | 9 | 1 |
| | 10 | 1 |
| | 11 | 1 |
| to inter-controller link | 12 | 127 |
| | 13 | 127 |
| | 14 | 127 |
| | 15 | 127 |
| to initiator A | 16 | 1 |
| | 17 | 1 |
| | 18 | 1 |
| | 19 | 1 |
| to expander B of expansion chassis A | 20 | 1 |
| | 21 | 1 |
| | 22 | 1 |
| | 23 | 1 |
| to initiator B | 24 | 2 |
| | 25 | 2 |
| | 26 | 2 |
| | 27 | 2 |
| to expander B of expansion chassis B | 28 | 2 |
| | 29 | 2 |
| | 30 | 2 |
| | 31 | 2 |
| un-connected | 32 | 0 |
| | 33 | 0 |
| | 34 | 0 |
| | 35 | 0 |

Fig. 5 — 500

| zone group | 0 | 1 | 2 | 3 to 126 | 127 |
|---|---|---|---|---|---|
| 0 | 0 | 0 | 0 | 0 | 1 |
| 1 | 0 | 1 | 0 | 0 | 1 |
| 2 | 0 | 0 | 1 | 0 | 1 |
| 3 to 126 | 0 | 0 | 0 | 0 | 1 |
| 127 | 1 | 1 | 1 | 1 | 1 |

Drives in expansion chassis B are not accessible by RAID controller A via the local path to them due to a failed cable from RAID controller A to expansion chassis B. Therefore, RAID controller A accesses the drives in expansion chassis B via the remote path.

RAID controller A is failed. However, RAID controller B continues to access all of the drives in the system via its local path to them.

HIGH DATA AVAILABILITY SAS-BASED RAID SYSTEM

BACKGROUND OF THE INVENTION

Field of the Invention

The present invention relates in general to the field of RAID controllers that connect to storage devices via the Serial Attached SCSI (SAS) standard, and particularly to the use of zoning expanders therein for high data availability.

Serial-Attached-SCSI (SAS) systems are becoming more and more common in modern computer systems. SAS systems include SAS initiator devices and SAS target devices as does its parent, the Small Computer Systems Interface (SCSI). SAS target devices are typically storage devices, such as disk drives, that receive commands from SAS initiator devices, such as SAS host bus adapters in host computers or SAS I/O controllers in Redundant Arrays of Inexpensive Disks (RAID) controllers.

Implementations and uses of SAS are described in detail in the following documents, each of which is incorporated by reference in its entirety for all intents and purposes:

"Serial Attached SCSI-1.1 (SAS-1.1)", Revision 10, Sep. 21, 2005. Working Draft, Project T10/1601-D, Reference number ISO/IEC 14776-151:200x. American National Standard Institute. (http://www.t10.org/ftp/t10/drafts/sas1/sas1 r10.pdf)

"Serial Attached SCSI-2 (SAS-2)", Revision 6, Sep. 22, 2006. Working Draft, Project T10/1760-D, Reference number ISO/IEC 14776-152:200x. American National Standard Institute. (http://www.t10.org/ftp/t10/drafts/sas2/sas2r06.pdf)

"Serial Attached SCSI-2 (SAS-2)", Revision 10, May 15, 2007. Working Draft, Project T10/1760-D, Reference number ISO/IEC 14776-152:200x. American National Standard Institute. (http://www.t10.org/ftp/t10/drafts/sas2/sas2r10.pdf)

SAS systems are built on point-to-point serial connections between SAS devices. Each point-to-point connection is referred to as a link, or lane, and the two endpoints are referred to as a PHY. A PHY contains a transmitter device (TX) and receiver device (RX) and electrically interfaces to a link to communicate with another PHY at the other end of the link. The link, or lane, includes two differential signal pairs, one in each direction. A SAS port includes one or more PHYs. A SAS port that has more than one PHY grouped together is referred to as a wide port, and the more than one links coupling the two wide ports are referred to as a wide link. Wide ports and links provide increased data transfer rates between SAS endpoints and enable multiple simultaneous connections to be open between a SAS initiator and multiple SAS targets.

The simplest SAS topology is a single SAS initiator having a SAS port that is connected by a single SAS link to a SAS port of a single SAS target. However, it is desirable in many applications, such as a high data availability RAID system, to enable one or more SAS initiators to communicate with multiple SAS target devices. In addition to initiators and targets, SAS includes a third type of device, expanders, which are employed in SAS systems to achieve more complex topologies. SAS expanders perform switch-like functions, such as routing, to enable SAS initiators and targets to communicate via the SAS point-to-point connections.

The present inventors have observed various problems in complex topology SAS systems when a component is marginal or goes bad, such as a SAS device that generates logical errors, improper PHY analog settings, a bad or marginal PHY, or a bad or marginal link, which may include bad or marginal cables, connectors, or printed circuit board assembly traces. Some of the manifestations of the faulty components include intermittent communication errors between SAS devices, complete loss of a SAS link, or failure of an entire SAS domain. Another manifestation is the inability for an initiator to see a SAS target in the topology due to intermittent failures that cause a SAS device to work sufficiently well to be allowed into the topology, but to be sufficiently faulty to prevent effective communication between SAS devices in the domain.

The following scenario illustrates an example of a failure mode that effectively renders a SAS domain non-functional. Assume a component fails in an intermittent fashion, such as a marginal PHY, that causes a SAS expander to first detect that a SAS link is operating properly, to subsequently detect that the link is not operating properly, and to continue this sequence for a relatively long time. According to the SAS standard, the SAS expander is required to transmit a BROADCAST primitive on each of its SAS ports to notify other SAS devices of the change of status within the SAS domain. Each time a SAS initiator receives the BROADCAST primitive it typically performs a SAS discover process to discover the device type, SAS address, and supported protocols of each SAS device in the SAS domain and to configure route tables within the SAS expanders as needed. The SAS discover process can take a relatively large amount of time. If the SAS expander transmits BROADCAST primitives due to the operational to non-operational link transitions according to a period that is comparable to the SAS discover process time, then consequently the SAS initiator may be unable to effectively send commands though the SAS domain to identify and remedy the problem. Or, even if the initiator is successful in identifying and fixing the problem, the SAS domain may have been effectively unavailable for providing user data transfers for an unacceptable length of time.

Another example of a common failure mode is a non-functional SAS cable linking two SAS devices. Another failure that may render a SAS domain non-functional is that an entire SAS expander fails, either completely or intermittently, such as due to a software or hardware problem in the SAS expander.

Therefore, what is needed is a solution to improve the data availability in SAS systems, which are subject to the foregoing problems and problems related thereto.

BRIEF SUMMARY OF INVENTION

In one aspect, the present invention provides a system that includes first and second redundant array of inexpensive disks (RAID) controllers, configured in an active-active failover redundant manner. Each RAID controller includes first and second Serial Attached SCSI (SAS) initiator devices and a SAS expander, coupled to the first and second SAS initiator devices, configured to have first, second, and third zone groups. With respect to the SAS expander of the first RAID controller, the first zone group includes PHYs linked to the first initiator device and PHYs configured to link to a first port of a first plurality of disk drives, wherein the second zone group includes PHYs linked to the second initiator device and PHYs configured to link to a first port of a second plurality of disk drives, and the third zone group includes PHYs linked to the SAS expander of the second RAID controller. With respect to the SAS expander of the second RAID controller, the first zone group includes PHYs linked to the first initiator device and PHYs configured to link to a second port of the second plurality of disk drives, wherein the second zone group includes PHYs linked to the second initiator device and PHYs configured to link to a second port of the first plurality of disk drives, and the third zone group includes PHYs linked to the SAS expander of the first RAID controller. The SAS expanders are collectively configured to permit PHYs in the first zone group to access PHYs in the first and third zone groups but to exclude PHYs in the first zone group from accessing PHYs in the second zone group, to permit PHYs in the second zone group to access PHYs in the second and third zone groups but to exclude PHYs in the second zone group from accessing PHYs in the first zone group, and to permit PHYs in the third zone group to access PHYs in the first, second, and third zone groups. Accordingly a first SAS domain is created within the system that includes the first initiator device of the first and second RAID controllers, the first port of the first plurality of disk drives, and the second port of the second plurality of disk drives, but excludes the second initiator device of the first and second RAID controllers, the first port of the second plurality of disk drives, and the second port of the first plurality of disk drives; and a second SAS domain is created within the system that includes the second initiator device of the first and second RAID controllers, the first port of the second plurality of disk drives, and the second port of the first plurality of disk drives, but excludes the first initiator device of the first and second RAID controllers, the first port of the first plurality of disk drives, and the second port of the second plurality of disk drives.

In another aspect, the present invention provides a method for configuring a system having first and second redundant array of inexpensive disks (RAID) controllers to operate in an active-active manner. The method includes configuring each of the first and second RAID controllers to include first and second Serial Attached SCSI (SAS) initiator devices and a SAS expander coupled to the first and second SAS initiator devices. The method also includes configuring the SAS expanders to have first, second, and third zone groups. With respect to the SAS expander of the first RAID controller, the first zone group includes PHYs linked to the first initiator device and PHYs configured to link to a first port of a first plurality of disk drives, wherein the second zone group includes PHYs linked to the second initiator device and PHYs configured to link to a first port of a second plurality of disk drives, and the third zone group includes PHYs linked to the SAS expander of the second RAID controller. With respect to the SAS expander of the second RAID controller, the first zone group includes PHYs linked to the first initiator device and PHYs configured to link to a second port of the second plurality of disk drives, wherein the second zone group includes PHYs linked to the second initiator device and PHYs configured to link to a second port of the first plurality of disk drives, and the third zone group includes PHYs linked to the SAS expander of the first RAID controller. The method also includes collectively configuring the SAS expanders to permit PHYs in the first zone group to access PHYs in the first and third zone groups but to exclude PHYs in the first zone group from accessing PHYs in the second zone group, to permit PHYs in the second zone group to access PHYs in the second and third zone groups but to exclude PHYs in the second zone group from accessing PHYs in the first zone group, and to permit PHYs in the third zone group to access PHYs in the first, second, and third zone groups. The method also includes creating within the system a first SAS domain that includes the first initiator device of the first and second RAID controllers, the first port of the first plurality of disk drives, and the second port of the second plurality of disk drives, but excludes the second initiator device of the first and second RAID controllers, the first port of the second plurality of disk drives, and the second port of the first plurality of disk drives. The method also includes creating within the system a second SAS domain that includes the second initiator device of the first and second RAID controllers, the first port of the second plurality of disk drives, and the second port of the first plurality of disk drives, but excludes the first initiator device of the first and second RAID controllers, the first port of the first plurality of disk drives, and the second port of the second plurality of disk drives.

In another aspect, the present invention provides a system that includes a first redundant array of inexpensive disks (RAID) controller. The first RAID controller includes a SAS expander. The first RAID controller also includes a first SAS initiator device, coupled to the SAS expander, configured to access a first respective port of a first plurality of disk drives exclusively via a first respective plurality of local SAS paths, and to access a first respective port of a second plurality of disk drives exclusively via a first respective plurality of remote SAS paths. The first RAID controller also includes a second SAS initiator device, coupled to the SAS expander, configured to access a second respective port of the second plurality of disk drives exclusively via a second respective plurality of local SAS paths, and to access a second respective port of the first plurality of disk drives exclusively via a second respective plurality of remote SAS paths. The system also includes a second RAID controller. The second RAID controller includes a SAS expander. The second RAID controller also includes a first SAS initiator device, coupled to the SAS expander, configured to access the first respective port of the second plurality of disk drives exclusively via a third respective plurality of local SAS paths, and to access the first respective port of the first plurality of disk drives exclusively via a third respective plurality of remote SAS paths. The second RAID controller also includes a second SAS initiator device, coupled to the SAS expander, configured to access the second respective port of the first plurality of disk drives exclusively via a fourth respective plurality of local SAS paths, and to access the second respective port of the second plurality of disk drives exclusively via a fourth respective plurality of remote SAS paths. The system also includes a SAS link, linking the SAS expander of the first RAID controller to the SAS expander of the second RAID controller, wherein each of the first, second, third, and fourth pluralities of local SAS paths excludes the SAS link. Each of the first, second, third, and fourth pluralities of remote SAS paths includes the SAS link. The SAS expanders are configured in conjunction with one another as a single zoned portion of a SAS delivery subsystem (ZPSDS) that creates first and second SAS domains. The first SAS domain includes and the second SAS domain excludes ports of the first SAS initiator devices and the first respective port of the first and second plurality of disk drives. The second SAS domain includes and the first SAS domain excludes ports of the second SAS initiator devices and the second respective port of the first and second plurality of disk drives.

BRIEF DESCRIPTION OF THE DRAWINGS

FIG. 4 is a table illustrating two PHY-to-zone mapping tables according to the present invention.

FIG. 5 is a table illustrating a zone permission table according to the present invention.

DETAILED DESCRIPTION

Figure 1:
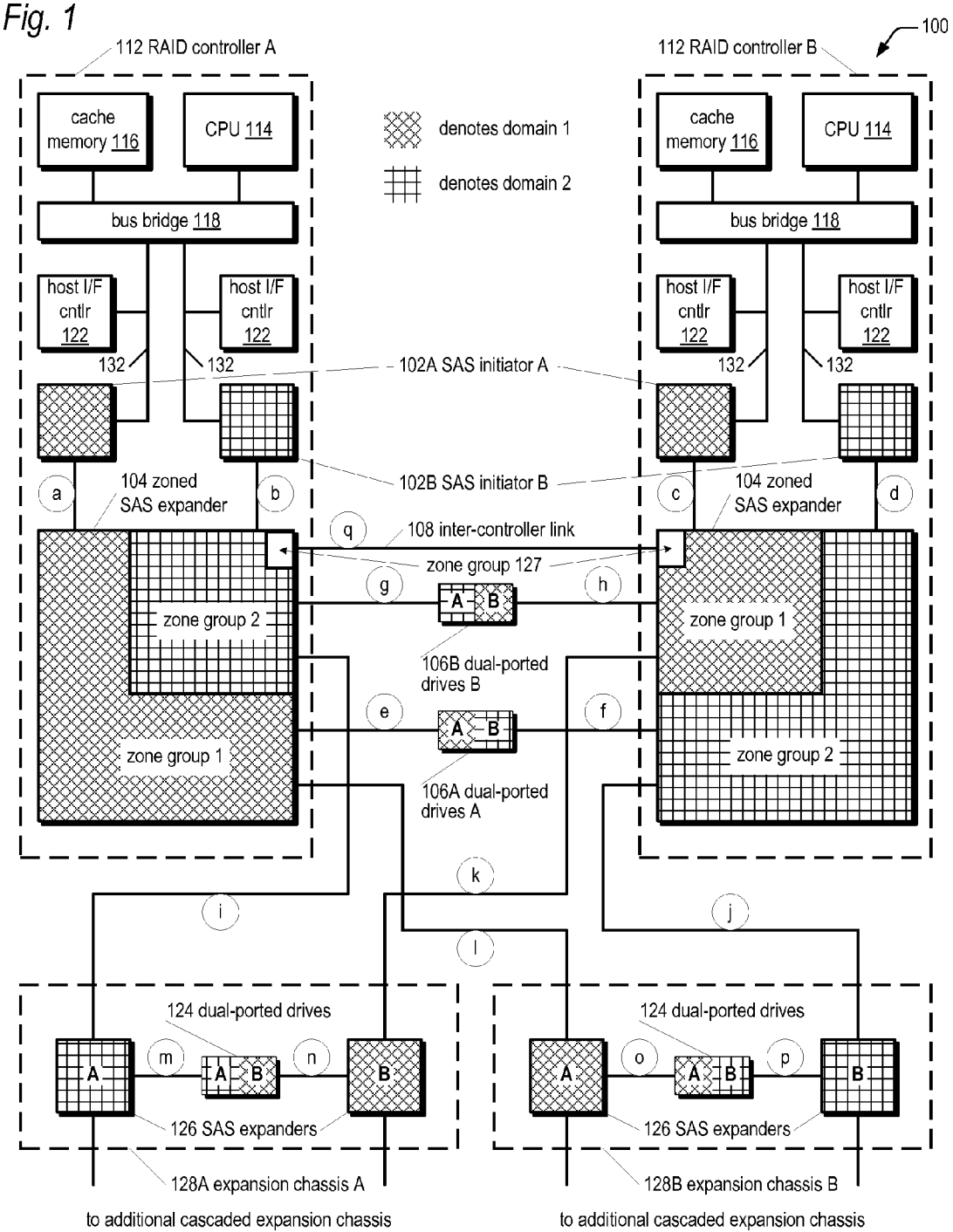
FIG. 1 is a block diagram illustrating an active-active redundant RAID controller storage system according to the present invention.

Referring now to FIG. 1, a block diagram illustrating an active-active redundant RAID controller storage system 100 according to the present invention is shown. Advantageously, the system 100 employs a unique SAS topology to provide improved data availability over conventional systems. The system configuration includes two RAID controllers, each having two SAS initiators coupled to a zoning SAS expander configured with a unique zoning configuration, and an inter-controller SAS link between the zoned SAS expander of each RAID controller. In particular, the SAS topology is configured to create two SAS domains. One initiator of each RAID controller is in one SAS domain and the other initiator is in the other SAS domain. The port of each SAS expander that is coupled to the inter-controller link is included in a special zone group to enable each initiator of each RAID controller to access a complementary half of the disk drives in the system indirectly through the other RAID controller's expander via the inter-controller SAS link. The disk drives are dual-ported, and the SAS topology is configured such that one port of each drive is in one SAS domain and the other port of each drive is in the other SAS domain, and each initiator on each RAID controller can access every drive in the system. Specifically, each initiator can access one half of the drives directly via its local expander and can access the other half of the drives indirectly through the other RAID controller's expander via the inter-controller SAS link. Thus, advantageously, if one SAS domain becomes non-functional, rendering one SAS initiator of each RAID controller effectively unable to access the drives via the non-functional SAS domain, the other SAS initiator of each RAID controller can still access all of the drives in the system via the other SAS domain. In particular, the other initiator can access the port in the functioning domain of half the drives via a direct SAS path and the other half via an indirect SAS path that includes the inter-controller link. Furthermore, if one of the RAID controllers becomes non-functional and the system fails over to the functional RAID controller, the functional RAID controller can still access all of the drives without reconfiguring the local expander, because each initiator of the functional RAID controller can access a respective half of the drives via the direct SAS path through the local expander as initially configured. Finally, the system configuration enables the RAID controllers to continue to access all of the drives even after the occurrence of many single points of failure, such as a failure of a SAS link from a RAID controller to a drive expansion chassis or an inter-expansion chassis link.

The system 100 of FIG. 1 includes two RAID controllers 112A and 112B, referred to collectively as RAID controllers 112, or generically individually as RAID controller 112. In one embodiment, the RAID controllers 112 reside in an enclosure that includes slots for the two RAID controllers 112 designated slot A and slot B. Each RAID controller 112 has the ability to sense whether it is in slot A or slot B. The RAID controllers 112 are coupled to a backplane or midplane within the enclosure. The RAID controllers 112 are essentially the same, the main exception being the configuration of their zoning SAS expanders, as described below.

Each RAID controller 112 includes a bus bridge 118 coupled to a CPU 114 and a cache memory 116. The bus bridge 118 includes bus bridging circuitry for bridging the various buses connected to it, namely the CPU 114 bus, cache memory 116 bus, and local buses discussed below. The bus bridge 118 also includes a memory controller for controlling the cache memory 116. The bus bridge 118 also includes DMA controller circuitry. In one embodiment, the bus bridge 118 also includes a PCI-Express interface for controlling a PCI-Express link (not shown) with the bus bridge 118 of the other RAID controller 112 for performing direct memory transfers between the cache memory 116 of the two RAID controllers 112.

The bus bridge 118 is also coupled to first and second host interface controllers 122 by first and second respective local buses 132, such as a PCI bus, PCI-X bus, PCI-Express bus, or similar high-speed local bus. The host interface controllers 122 are used for interfacing with host computers that issue I/O requests to the system 100. In one embodiment, the system 100 may be part of a storage area network (SAN). The host interface controllers 122 may comprise various interfaces such as Fibre Channel, Ethernet, InfiniBand, SCSI, HIPPI, Token Ring, Arcnet, FDDI, LocalTalk, ESCON, FICON, ATM, SAS, SATA, iSCSI, and the like.

The bus bridge 118 is also coupled by the local buses 132 to respective first and second SAS initiators, denoted 102A and 102B, and referred to collectively as SAS initiators 102, or generically individually as SAS initiator 102. The SAS initiators 102 are each coupled to a zoned SAS expander 104 via SAS links. Each RAID controller 112 configures its respective zoned SAS expander 104 slightly differently depending upon whether it is in slot A or slot B, as described below. In one embodiment, each SAS initiator 102 is a SAS1064, developed by LSI Logic, Inc. of Colorado Springs, Colo. The SAS1064 can support a maximum of 122 total SAS addresses.

The zoned SAS expander 104 in RAID controller A 112A is linked to the zoned SAS expander 104 in RAID controller B 112B by an inter-controller SAS link 108. In one embodiment, the inter-controller link 108 is a 4× wide SAS link. In one embodiment, a portion of the inter-controller link 108 is located on a midplane of the enclosure. In one embodiment, if one of the RAID controllers 112 fails, the good RAID controller 112 disables the ports of its zoned SAS expander 104 that are coupled to the inter-controller link 108 as part of the failover operation. In one embodiment, the SAS port coupled to the inter-controller link 108 (i.e., the port comprising the PHYs in zone group 127, discussed below) is the subtractive routing port of each of the zoned SAS expanders 104. The subtractive routing port of a SAS expander is attached to another SAS expander and is the port to which the SAS expander routes unresolved connection requests, i.e., connection requests that are not resolved by direct routing or table routing.

The system 100 also includes a first set of dual-ported disk drives A 106A and a second set of dual-ported disk drives B 106B, referred to collectively as dual-ported disk drives 106, or generically individually as dual-ported disk drive 106. One port of each dual-ported disk drive 106 is coupled to the SAS expander 104 of RAID controller A 112A and is denoted port "A", and the other port of each dual-ported disk drive 106 is coupled to the SAS expander 104 of RAID controller B 112B and is denoted port "B". Each port of each of the disk drives 106 (and disk drive 124, described below) has its own unique SAS address that is discovered by the CPU 114 during the SAS discovery process.

In one embodiment, the RAID controllers 112 and first and second sets of dual-ported disk drives 106 are enclosed in the same enclosure. In one embodiment, the enclosure is configured to store up to six drives in each of the first and second sets of dual-ported disk drives 106. In one embodiment, the dual-ported disk drives 106 are linked to the zoned SAS expanders 104 via a midplane of the enclosure. Use of the term dual-ported disk drive herein may refer either to a dual-ported SAS disk drive or to a SATA disk drive with an Active-Active (AA) multiplexing device that effectively makes the SATA disk drive appear as a dual-ported SAS disk drive.

The system 100 also includes an expansion chassis A 128A linked to the SAS expander 104 of each of the RAID controllers 112, and an expansion chassis B 128B linked to the SAS expander 104 of each of the RAID controllers 112. Each expansion chassis 128 includes two SAS expanders 126, denoted expander "A" and expander "B", and a plurality of dual-ported disk drives 124. Port A of each of the dual-ported disk drives 124 is linked to expander A, and port B of each of the dual-ported disk drives 124 is linked to expander B. In one embodiment, each expansion chassis 128 is configured to enclose up to twelve dual-ported disk drives 124.

Expander A of expansion chassis A 128A is linked to the zoned SAS expander 104 of RAID controller A 112A. Expander B of expansion chassis A 128A is linked to the zoned SAS expander 104 of RAID controller B 112B. Expander A of expansion chassis B 128B is linked to the zoned SAS expander 104 of RAID controller A 112A. Expander B of expansion chassis B 128B is linked to the zoned SAS expander 104 of RAID controller B 112B. The upstream SAS ports of the SAS expanders 126 of the expansion chassis 128 (i.e., that link to the zoned SAS expanders 104 of the RAID controllers 112) are referred to as ingress ports. The SAS expanders 126 of the expansion chassis 128 also include SAS ports, referred to as egress ports, for linking to additional downstream expansion chassis 128. In one embodiment, the system 100 may include four expansion chassis 128 in the left branch and four expansion chassis 128 in the right branch, making a total of eight expansion chassis 128, such that the RAID controllers 112 control up to 108 dual-ported disk drives 106/124. In one embodiment, the SAS links linking the SAS expanders 126 from the expansion chassis 128 to the zoned SAS expanders 104 and to additional expansion chassis 128 are 4× wide SAS links.

In one embodiment, the zoned SAS expanders 104 are a PM8398 SXP 36 Gsec 36-port SAS expander available from PMC-Sierra, Inc., of Santa Clara, Calif., in which the present inventors programmed the initialization string to include the zoning configuration, including a PHY-to-zone mapping table 400 and zone permission table 500 described in FIGS. 4 and 5, respectively, to provide advantages of the embodiments described herein. In one embodiment, the zoned SAS expanders 104 configure themselves at boot time, and the configuration information is stored in a non-volatile memory read by an Expander Controller (EC) processor within the zoned SAS expander 104. In one embodiment, the SAS expanders 126 of the expansion chassis 128 are non-zoned PM8388 SAS expanders available from PMC-Sierra, Inc.

The cache memory 116 is employed by the RAID controller 112 to buffer data transferred between the host computers and the disk drives 106/124. When a host requests data to be written to the disk drives 106/124, the RAID controller 112 transfers the data from the host via the host interfaces 122 into the cache memory 116 and subsequently transfers the data from the cache memory 116 via the SAS subsystem to the disk drives 106/124. Conversely, when a host requests data to be read from the disk drives 106/124, the RAID controller 112 transfers the data from the disk drives 106/124 via the SAS subsystem to the cache memory 116 and subsequently transfers the data from the cache memory 116 via the host interface 122 to the host.

The CPU 114 may comprise a CPU subsystem that may include any processor capable of executing stored programs, including but not limited to, for example, a processor and chipset, such as an x86 architecture processor and what are commonly referred to as a North Bridge or Memory Control Hub (MCH) and a South Bridge or I/O Control Hub (ICH), which includes I/O bus interfaces, such as an interface to an ISA bus or a PCI-family bus. In one embodiment, the CPU subsystem 114 comprises a Transmeta TM8800 processor that includes an integrated North Bridge and an ALi M1563S South Bridge. In another embodiment, the CPU subsystem 114 comprises an Intel Celeron M processor and an MCH and ICH. In another embodiment, the CPU subsystem 114 comprises an AMD Mobile Sempron processor with an integrated North Bridge and an Ali M1563S South Bridge. In one embodiment, the CPU subsystem 114 also includes RAM for storing program instructions that are fetched and executed by the microprocessor and a FLASH memory, operatively coupled to the CPU subsystem 114, for storing the program instructions in a non-volatile manner and which is decompressed and written to the program RAM for execution by the microprocessor.

The CPU subsystem 114 receives host computer I/O requests from the host interfaces 122 and processes the requests. Processing the requests may include various functions. For example, the host I/O request specifies a logical block number and number of blocks of data to be transferred to or from the redundant array; however, these logical blocks and number of blocks do not typically correspond to the appropriate physical block numbers and number of blocks on the physical disks 106/124 comprising the redundant array. Therefore, the logical block number specified in the host I/O request must be translated into the appropriate physical block number, number of blocks, and disk to be used in performing one or more data transfers between the RAID controller 112 and the disks comprising the redundant array. This translation function is performed by the CPU subsystem 114. In one embodiment, the CPU subsystem 114 performs the translation according to well-known RAID techniques.

After performing the translation, the CPU subsystem 114 programs the appropriate SAS initiator 102 to perform the data transfers between the disks and the cache memory 116. In particular, the CPU 114 determines which path in the SAS topology will be used to send commands to each destination disk drive 106/124. That is, the CPU 114 determines through which of the SAS initiators 102A/102B and to which of the drive ports A or B the commands will be sent, as described in detail with respect to FIG. 6. A SAS path is the set of links between a SAS initiator port and a SAS target port that are used by a connection between the SAS initiator port and the SAS target port. Herein, the term "remote path" or "indirect path" or "alternate path" refers to the SAS path to a disk drive 106/124 from a SAS initiator 102 through the SAS topology that includes the inter-controller link 108 (and thus includes the zoned SAS expander 104 of the other RAID controller 112), whereas the term "local path" or "direct path" refers to the SAS path to a disk drive 106/124 from a SAS initiator 102 through the SAS topology that does not include the inter-controller link 108 (and thus excludes the zoned SAS expander 104 of the other RAID controller 112). A SAS path includes all of the SAS links and SAS expanders connecting the SAS initiator 102 and target disk drive 106/124.

Various SAS links are denoted as encircled lower cases letters "a" through "q" of FIG. 1. Link (a) is from SAS initiator A 102A to the zoned SAS expander 104 of RAID controller A 112A. Link (b) is from SAS initiator B 102B to the zoned SAS expander 104 of RAID controller A 112A. Link (c) is from SAS initiator A 102A to the zoned SAS expander 104 of RAID controller B 112B. Link (d) is from SAS initiator B 102B to the zoned SAS expander 104 of RAID controller B 112B. Link (e) is from the zoned SAS expander 104 of RAID controller A 112A to port A of disk drives A 106A. Link (f) is from the zoned SAS expander 104 of RAID controller B 112B to port B of disk drives A 106A. Link (g) is from the zoned SAS expander 104 of RAID controller A 112A to port A of disk drives B 106B. Link (h) is from the zoned SAS expander 104 of RAID controller B 112B to port B of disk drives B 106B. Link (i) is from the zoned SAS expander 104 of RAID controller A 112A to expander A of expansion chassis A 128A. Link (j) is from the zoned SAS expander 104 of RAID controller B 112B to expander B of expansion chassis B 128B. Link (k) is from the zoned SAS expander 104 of RAID controller B 112B to expander B of expansion chassis A 128A. Link (l) is from the zoned SAS expander 104 of RAID controller A 112A to expander A of expansion chassis B 128B. Link (m) is from expander A to port A of disk drives 124 of expansion chassis A 128A. Link (n) is from expander B to port B of disk drives 124 of expansion chassis A 128A. Link (o) is from expander A to port A of disk drives 124 of expansion chassis B 128B. Link (p) is from expander B to port B of disk drives 124 of expansion chassis B 128B. Link (q) is the inter-controller link 108.

The following table lists the path, if any, from each SAS initiator 102 to each port of each disk drive 106/124 in the system 100, and indicates whether the path is local or remote. If no path exists, then the corresponding cell in the table is blank.

| | RAID controller A 112A, SAS initiator A 102A | RAID controller A 112A, SAS initiator B 102B | RAID controller B 112B, SAS initiator A 102A | RAID controller B 112B, SAS initiator B 102B |
|---|---|---|---|---|
| disk drives A 106A, port A | a, e LOCAL | | c, q, e REMOTE | |
| disk drives A 106A, port B | | b, q, f REMOTE | | d, f LOCAL |
| disk drives B 106B, port A | | b, g LOCAL | | d, q, g REMOTE |
| disk drives B 106B, port B | a, q, h REMOTE | | c, h LOCAL | |
| disk drives 124, port A, expansion chassis A 128A | | b, i, m LOCAL | | d, q, i, m REMOTE |
| disk drives 124, port B, expansion chassis A 128A | a, q, k, n REMOTE | | c, k, n LOCAL | |
| disk drives 124, port A, expansion chassis B 128B | a, l, o LOCAL | | c, q, l, o REMOTE | |
| disk drives 124, port B, expansion chassis B 128B | | b, q, j, p REMOTE | | d, j, p LOCAL |

Additionally, the CPU subsystem 114 programs the host interfaces 122 to perform data transfers between the host computers and the cache memory 116. Thus, when processing a host I/O request to write data from a host computer to a redundant array, the CPU subsystem 114 programs the host interface 122 to transfer data from the host computer to the cache memory 116; after the data is received into the cache memory 116, the CPU subsystem 114 programs the appropriate SAS initiator 102 to transfer the data from the cache memory 116 to the translated appropriate physical block numbers of the disks 106/124 comprising the redundant array. Conversely, when processing a host I/O request to read data from a redundant array to a host computer, the CPU subsystem 114 programs the appropriate SAS initiator 102 to transfer the data to the cache memory 116 from the translated appropriate physical block numbers of the disks comprising the redundant array; after the data is received into the cache memory 116, the CPU subsystem 114 programs the host interface 122 to transfer the data to the host computer from the cache memory 116. The CPU subsystem 114 also performs the function of managing allocation of portions of the cache memory 116 for performing the data transfers, and in particular of cache management, i.e., managing the cache memory 116 as a cache memory for caching portions of the data buffered in cache memory 116 in order to improve I/O performance between the redundant arrays and the host computers according to well-known caching techniques. In one embodiment, the CPU subsystem 114 performs exclusive-OR operations of the data required in certain RAID levels that employ parity data as the redundant data, such as RAID level 5, for example. In one embodiment, the CPU subsystem 114 programs a dedicated exclusive-OR circuit comprised within the bus bridge 118 to perform the exclusive-OR operation on the user data to generate the redundant parity data.

Before describing system 100 of FIG. 1 in further detail, two conventional systems 200 and 300 of FIGS. 2 and 3, respectively, will be described in order to make comparisons between the conventional systems 200/300 and system 100 of the present invention to more clearly and fully disclose the operation and advantages of system 100.

Figure 2:
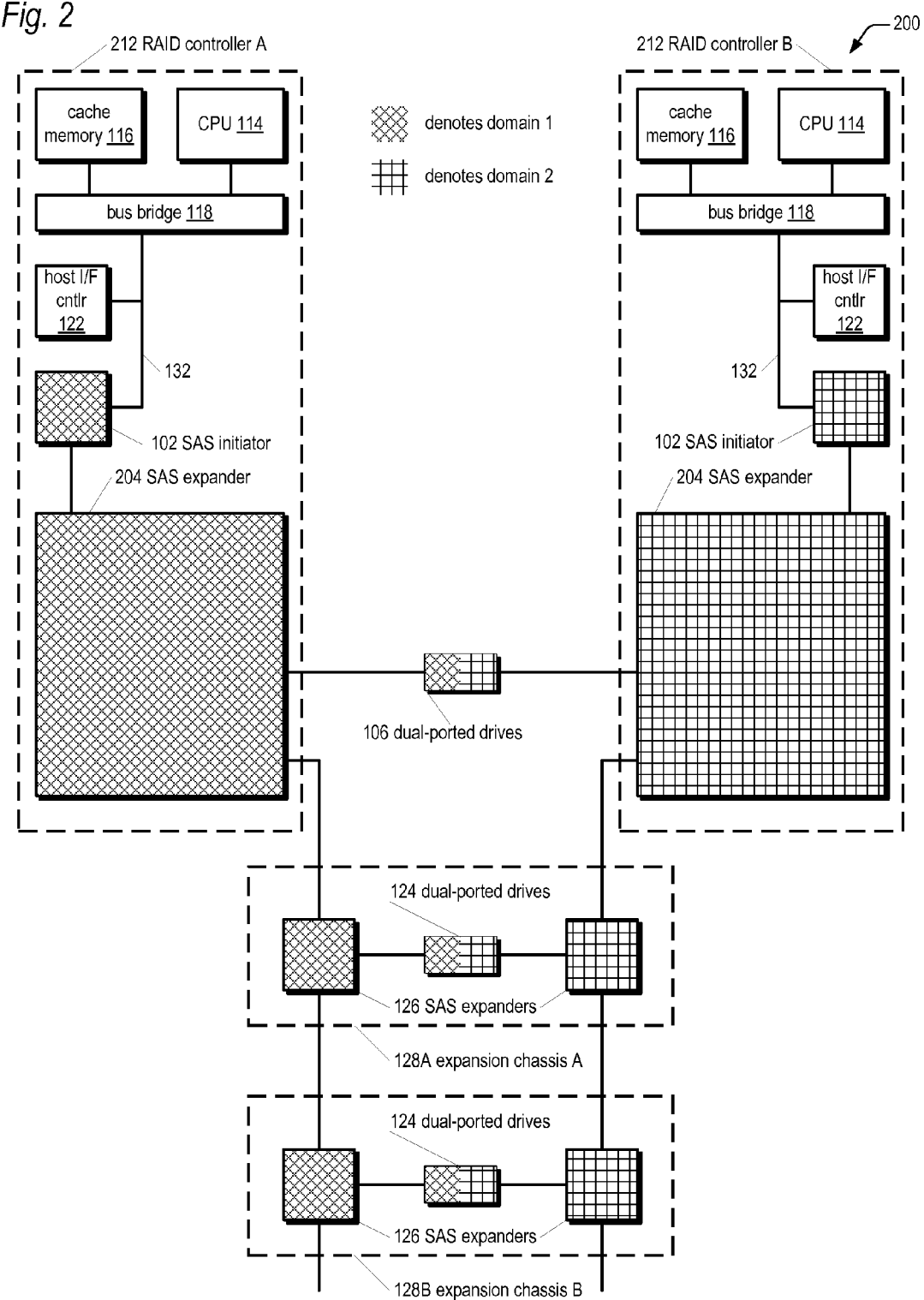
FIG. 2 is a block diagram illustrating a conventional active-active redundant RAID system.

Referring now to FIG. 2, a block diagram illustrating a conventional active-active redundant RAID system 200. The system 200 includes two RAID controllers 212A and 212B, which are similar in many respects to the RAID controllers 112 of FIG. 1 and like-numbered elements are similar. However, there are two main differences between the RAID controllers 212 of FIG. 2 and the RAID controllers 112 of FIG. 1. First, the RAID controllers 112 of FIG. 1 include two SAS initiators 102; whereas, the RAID controllers 212 of FIG. 2 only include a single SAS initiator 102. Thus, the RAID controllers 212 of the system 200 of FIG. 2 can only access disk drives 106/124 in a single SAS domain; whereas, the system 100 of FIG. 1 is configured such that the RAID controllers 112 of can access disk drives 106/124 in two different SAS domains, as discussed in detail below. Second, the SAS expanders 104 of the RAID controllers 112 of FIG. 1 are zoned SAS expanders 104 that are configured to provide the unique zoning characteristics described herein, namely two SAS domains each accessible by each of the RAID controllers 112, as discussed in detail below; whereas, the SAS expanders 204 of the RAID controllers 212 of FIG. 2 are non-zoned SAS expanders 204, such as the PM8388 SAS expander available from PMC-Sierra, Inc.; consequently, each RAID controller 212 of system 200 can only access disk drives 106/124 in a single SAS domain.

Another difference between the system 200 of FIG. 2 and the system 100 of FIG. 1 is the manner in which the expansion chassis 128 are linked to the RAID controllers 212. In the system 100 of FIG. 1, two expansion chassis 128 are linked to each of the two RAID controllers 112 to form two branches, and additional expansion chassis 128 may be cascaded down each of the branches; whereas, the system 200 of FIG. 2, a single expansion chassis 128 is linked to each of the two RAID controllers 212 to form a single branch, and additional expansion chassis 128 may be cascaded down the single branch.

An advantage of the system 200 of FIG. 2 over previous systems is that it allows both RAID controllers 212 to access all the disks 106/124 in the system 200. Another advantage of the system 200 of FIG. 2 over previous systems is that it allows a relatively large number of disks 106/124 to exist in the system 200; in particular, the number is effectively only limited to roughly the number of SAS addresses that may be supported by the SAS initiator 102 devices.

As shown in FIG. 2, the system 200 creates two distinct SAS domains, denoted domain 1 and domain 2 in FIG. 2. However, only one SAS domain is accessible by each RAID controller 212. The meaning and significance of SAS domains will be discussed in more detail below.

A disadvantage of the system 200 of FIG. 2 is that it is susceptible to certain single points of failure. For example, if a cable or connector fails that is linking one of the RAID controllers 212 to the expansion chassis 128 or linking two of the expansion chassis 128, then the RAID controller 212 can no longer access any of the disks 124 in the expansion chassis 128 linked by the failed cable or connector (or in any other downstream expansion chassis 128), since the RAID controller 212 only has one path to each disk 106/124. This makes the data on some of the disks 124 unavailable to the RAID controller 112 and potentially unavailable to some of the host computers, depending upon the manner in which the host computers are networked to the system 100, i.e., depending upon whether a given host computer is networked to both RAID controllers 212 or only to the RAID controller 212 implicated by the failed cable or connector. At a minimum, these failure modes effectively render the system 200 no longer redundant, and it can no longer function in an active-active manner.

Figure 3:
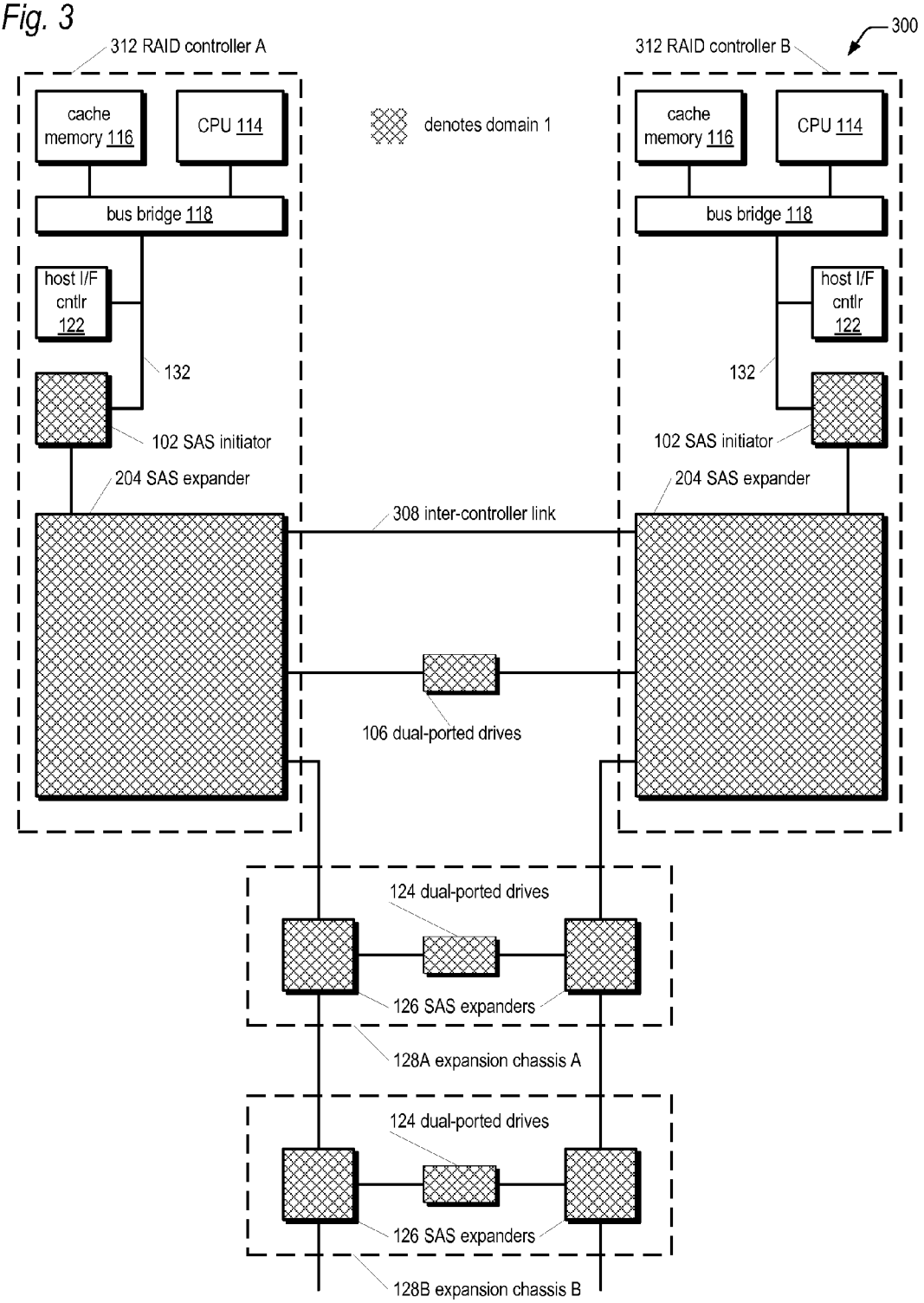
FIG. 3 is a block diagram illustrating a second conventional active-active redundant RAID system.

Referring now to FIG. 3, a block diagram illustrating a second conventional active-active redundant RAID system 300 is shown. The system 300 includes two RAID controllers 312A and 312B, which are similar in many respects to the RAID controllers 212 of FIG. 2 and like-numbered elements are similar. However, the main difference between the system 200 of FIG. 2 and the system 300 of FIG. 3 is that the system 300 of FIG. 3 includes an inter-controller link 308, similar to the system 100 of FIG. 1. The inter-controller link 308 of system 300 provides an advantage over the system 200 of FIG. 2, namely that it overcomes many of the single point of failure problems of system 200 of FIG. 2 because it provides each RAID controller 312 two paths to each disk 106/124. Thus, for example, if a cable or connector failure occurs in system 300 as described above with respect to the system 200 of FIG. 2, the RAID controller 312 can continue to access all of the drives 106/124 because the RAID controller 312 can access the drives 106/124 downstream from the failure via an alternate path through the inter-controller link 308.

However, the introduction of the inter-controller link 308 in the system 300 of FIG. 3 creates a disadvantage over the system 200 of FIG. 2 because it causes all the SAS initiators 102 and disks 106/124 in the SAS topology to be in a single domain, denoted domain 1 in FIG. 3. This has at least two undesirable effects. First, the number of disks 106/124 that may be included in the system is effectively reduced to roughly half the number of SAS addresses that is supportable by the SAS initiator 102 devices, since each SAS initiator 102 sees both ports of each of the disks 106/124. Thus, if the SAS initiator 102 can support only 122 SAS addresses, such as the SAS1064 for example, then the system 300 of FIG. 3 can only include at most half that number of disk drives 106/124. Second, if a failure occurs that renders a SAS domain effectively non-functional, then neither of the RAID controllers 312 can access any of the disks 106/124 in the system 300, resulting in data unavailability.

Advantageously, the system 100 of FIG. 1 solves the various problems associated with systems 200 and 300 of FIGS. 2 and 3, as will now be described.

Referring now to FIG. 4, a table illustrating two PHY-to-zone mapping tables 400A and 400B according to the present invention are shown. PHY-to-zone mapping table 400A specifies the mapping of each logical PHY of the zoned SAS expander 104 of RAID controller A 112A to a zone group identifier, and PHY-to-zone mapping table 400B specifies the mapping of each logical PHY of the zoned SAS expander 104 of RAID controller B 112B to a zone group identifier. As shown, each zoned SAS expander 104 recognizes three zone groups: 1, 2, and 127. The remaining zone groups are not used, namely zone groups 0 and 3-126. The PHY-to-zone mapping tables 400 are part of the zone PHY information maintained by the zoned SAS expander 104, which also includes an INSIDE ZPSDS bit for each PHY, which is discussed below.

With respect to RAID controller A 112A, the logical PHYs are mapped as follows. Logical PHYs 0-5 are mapped to zone group 1 and are each linked to port A of a respective one of the dual-ported disk drives A 106A of FIG. 1. Logical PHYs 6-11 are mapped to zone group 2 and are each linked to port A of a respective one of the dual-ported disk drives B 106B of FIG. 1. Logical PHYs 12-15 are mapped to zone group 127 and make up a 4× wide SAS port that is coupled to the 4× wide inter-controller link 108 of FIG. 1. Logical PHYs 16-19 are mapped to zone group 2 and make up a 4× wide SAS port that is coupled to the 4× wide link connecting the zoned SAS expander 104 to SAS initiator B 102B. Logical PHYs 20-23 are mapped to zone group 2 and make up a 4× wide SAS port that is coupled to the 4× wide link connecting the zoned SAS expander 104 to expander A of expansion chassis A 128A. Logical PHYs 24-27 are mapped to zone group 1 and make up a 4× wide SAS port that is coupled to the 4× wide link connecting the zoned SAS expander 104 to SAS initiator A 102A. Logical PHYs 28-31 are mapped to zone group 1 and make up a 4× wide SAS port that is coupled to the 4× wide link connecting the zoned SAS expander 104 to expander A of expansion chassis B 128B. Logical PHYs 32-35 correspond either to physical PHYs that are unconnected, or are used for other purposes, such as management agents.

With respect to RAID controller B 112B, the logical PHYs are mapped almost the same as the zoned SAS expander 104 of RAID controller A 112A, except that the mappings with respect to zone groups 1 and 2 are inverted as follows. Logical PHYs 0-5 are mapped to zone group 2 and are each linked to port B of a respective one of the dual-ported disk drives A 106A of FIG. 1. Logical PHYs 6-11 are mapped to zone group 1 and are each linked to port B of a respective one of the dual-ported disk drives B 106B of FIG. 1. Logical PHYs 12-15 are mapped to zone group 127 and make up a 4× wide SAS port that is coupled to the 4× wide inter-controller link 108 of FIG. 1. Logical PHYs 16-19 are mapped to zone group 1 and make up a 4× wide SAS port that is coupled to the 4× wide link connecting the zoned SAS expander 104 to SAS initiator A 102A. Logical PHYs 20-23 are mapped to zone group 1 and make up a 4× wide SAS port that is coupled to the 4× wide link connecting the zoned SAS expander 104 to expander B of expansion chassis A 128A. Logical PHYs 24-27 are mapped to zone group 2 and make up a 4× wide SAS port that is coupled to the 4× wide link connecting the zoned SAS expander 104 to SAS initiator B 102B. Logical PHYs 28-31 are mapped to zone group 2 and make up a 4× wide SAS port that is coupled to the 4× wide link connecting the zoned SAS expander 104 to expander B of expansion chassis B 128B. Logical PHYs 32-35 correspond either to physical PHYs that are unconnected, or are used for other purposes, such as management agents.

Referring now to FIG. 5, a table illustrating a zone permission table 500 according to the present invention is shown. The zone permission table 500 is depicted in FIG. 5 as a two-dimensional array whose columns specify source zone group numbers and whose rows represent destination zone group numbers. The source zone group is the zone group of the source PHY, and the destination zone group is the zone group of the destination PHY. Each entry in the array has either a 0 value or a 1 value. A 0 value indicates that the source zone group does not have permission to access the destination zone group; whereas, a 1 value indicates that the source zone group does have permission to access the destination zone group. As shown, zone group 1 has permission to access itself and zone group 127, but no others; zone group 2 has permission to access itself and zone group 127, but no others; zone group 127 has permission to access all zone groups; and all zone groups have permission to access zone group 127. Although zone groups 1, 2, and 127 are used in the embodiment of FIG. 5, other zone group values may be used.

In one embodiment, each of the zoned SAS expanders 104 includes an internal virtual initiator port and an internal virtual target port. Each of the virtual ports is in a different zone group not shown in the zone permission table 500 of FIG. 5. In particular, the virtual initiator and target ports of the zoned SAS expander 104 of RAID controller A 112A and the virtual initiator and target ports of the zoned SAS expander 104 of RAID controller B 112B are in different zone groups.

In one embodiment, the initialization string of the zoned SAS expanders 104 is programmed to cause the zoned SAS expanders 104 to set the INSIDE ZPSDS bit in the zone PHY information to one for the inter-controller link 108 ports during initialization of the SAS topology. This causes the zoned SAS expanders 104 to collectively define a zoned portion of a service delivery subsystem (ZPSDS).

Referring again to FIG. 1, the existence of dual SAS initiators 102 in each of the RAID controllers 112 and the zoning configuration described in tables 400 and 500 of FIGS. 4 and 5, respectively, advantageously creates within the SAS topology of the system 100 of FIG. 1 two domains, referred to as domain 1 and domain 2, as shown in FIG. 1, and each including one SAS initiator 102 from each RAID controller 112. Domain 1 includes SAS initiator A 102A of RAID controller A 112A, SAS initiator A 102A of RAID controller B 112B, port A of dual-ported disk drives A 106A, port B of dual-ported disk drives B 106B, port B of the dual-ported disk drives 124 of expansion chassis A 128A, and port A of the dual-ported disk drives 124 of expansion chassis B 128B. Domain 2 includes SAS initiator B 102B of RAID controller A 112A, SAS initiator B 102B of RAID controller B 112B, port B of dual-ported disk drives A 106A, port A of dual-ported disk drives B 106B, port A of the dual-ported disk drives 124 of expansion chassis A 128A, and port B of the dual-ported disk drives 124 of expansion chassis B 128B. Thus, each SAS initiator 102 in the system 100 can access one port of every disk drive 106/124 in the system 100. In particular, each SAS initiator 102 in the system 100 can access half of the disk drives 106/124 via the direct, or local, SAS path (i.e., the path that excludes the inter-controller link 108) and the other half of the disk drives 106/124 via the indirect, or remote, or alternate, path (i.e., the path that includes the inter-controller link 108). Consequently, if a failure occurs in the system 100 that effectively renders one of domain 1 or domain 2 non-functional, both RAID controller A 112A and RAID controller B 112B can continue to access all of the disk drives 106/124 in the system 100 via the other domain.

According to the SAS specification, a SAS domain is an I/O system defined by the SAS standard that may serve as an I/O system consisting of a set of SCSI devices that communicate with one another by means of a service delivery subsystem. A service delivery subsystem transmits information between a SAS initiator port and a SAS target port. In other words, a SAS domain is the set of SAS devices that are allowed to communicate with one another, namely the set of SAS initiators and SAS targets that are allowed to communicate with one another. Stated alternatively, the domain of a SAS initiator device is the set of SAS ports that are addressable by the SAS initiator device. More specifically, when a SAS expander detects the occurrence of a SAS domain change event, such as after a PHY completes a link reset sequence or transitions out of the PHY ready state, the SAS expander sends notification of the event only to SAS ports within the domain of the PHY detecting the domain change event. Consequently, SAS initiators that are not in the SAS domain of the PHY detecting the even are not involved in the subsequent discovery process caused by the domain change event, even though the SAS initiators are in the larger SAS topology of the system.

In particular, a SAS initiator 102 in the system 100 of FIG. 1 will not receive a BROADCAST (Change) primitive from its zoned SAS expander 104 unless the port that detected the domain change event is in the same domain as the SAS initiator 102. Thus, for example, assume a domain change event is detected by a port of the zoned SAS expander 104 of RAID controller A 112A linked to port A of one of dual-ported disk drives A 106A, which is in domain 1. The zoned SAS expander 104 of RAID controller A 112A would transmit a BROADCAST (Change) primitive to SAS initiator A 102A of RAID controller A 112A and also to SAS initiator A 102A of RAID controller B 112B (via the zoned SAS expander 104 of RAID controller B 112B over the inter-controller link 108) because they are in domain 1. However, the zoned SAS expander 104 of RAID controller A 112A would not transmit a BROADCAST (Change) primitive to SAS initiator B 102B of RAID controller A 112A or RAID controller B 112B because they are in domain 2, not domain 1. Furthermore, the zoned SAS expander 104 of RAID controller A 112A would behave the same if it received a BROADCAST (Change) primitive from expander A of one of the expansion chassis 128 (for example, due to expander A detecting the removal or insertion of a dual-ported disk drive 124) rather than detecting the domain change event itself.

The above behavior of containing BROADCAST (Change) primitive transmission within a SAS domain is accomplished according to one embodiment as illustrated by the following example. Assume logical PHY 5 of the zoned SAS expander 104 of RAID controller B 112B, which is a PHY in zone group 2 linked to port B of one of dual-ported disk drives A 106A, completes a link reset sequence with a newly attached disk or detects a transition out of the ready state caused by the removal of a disk. PHY 5 responsively issues a Broadcast Event Notify message to the Broadcast Propagation Processor (BPP) of the zoned SAS expander 104. The Broadcast has a single source zone group set to zone group 2 (the zone group of PHY 5), which the BPP of the zoned SAS expander 104 can determine from its PHY-to-zone mapping table 400. The BPP forwards the Broadcast message to each of its ports (other than the port that includes PHY 5) that are in zone groups 2 and 127, since the message is not a Broadcast (Zone Activate) and source zone group 2 has access to destination zone groups 2 and 127; however, the BPP does not forward the Broadcast message to its ports that are in zone group 1 since zone group 2 does not have permission to access zone group 1. Specifically, the BPP sends a Transmit Broadcast message to at least one PHY in each of its ports in the following list because their INSIDE ZPSDS bit is set to zero causing the respective PHY to transmit a BROADCAST (CHANGE) primitive: the ports linked to port B of dual-ported disk drives A 106A, because they are in zone group 2; the port linked to SAS initiator B 102B, because it is in zone group 2; and the port linked to expander B of expansion chassis B 128B, because it is in zone group 2. As a result of receiving the BROADCAST (CHANGE) primitive SAS initiator B 102B begins the discover process within domain 2. SAS initiator A 102A of RAID controller B 112B does not receive a BROADCAST (CHANGE) primitive and therefore does not perform a discover process. This is advantageous in failure modes where an intermittent failure might otherwise cause SAS initiator A 102A to effectively continuously perform discover processes if it were in domain 2.

Furthermore, because the inter-controller link 108 port of zoned SAS expander 104 of RAID controller B 112B is in zone group 127 and has its INSIDE ZPSDS bit set to one, the BPP requests the SMP initiator port of the zoned SAS expander 104 to establish a connection on at least one PHY in the inter-controller link 108 port to the SMP target port of the zoned SAS expander 104 of RAID controller A 112A and transmit an SMP ZONED BROADCAST (CHANGE) request specifying zone group 2 as the source zone group. When the BPP of the zoned SAS expander 104 of RAID controller A 112A receives a message from its management device server indicating that it received an SMP ZONED BROADCAST (CHANGE) request, it notes that the source zone group is 2, as specified in the SMP ZONED BROADCAST (CHANGE) request. In response, the BPP of the zoned SAS expander 104 of RAID controller A 112A forwards the Broadcast Event Notify (Change) message to each of its ports (other than the inter-controller link 108 port) that are in zone groups 2 and 127, since the message is not a Broadcast (Zone Activate) and source zone group 2 has access to destination zone groups 2 and 127; however, the BPP does not forward the Broadcast message to its ports that are in zone group 1 since zone group 2 does not have permission to access zone group 1. Specifically, the BPP sends a Transmit Broadcast message to at least one PHY in each of its ports in the following list because their INSIDE ZPSDS bit is set to zero, causing the PHY to transmit a BROADCAST (CHANGE) primitive: the ports linked to port A of dual-ported disk drives B 106B, because they are in zone group 2; the port linked to SAS initiator B 102B of RAID controller A 112A, because it is in zone group 2; and the port linked to expander A of expansion chassis A 128A, because it is in zone group 2. As a result of receiving the BROADCAST (CHANGE) primitive SAS initiator B 102B of RAID controller A 112A begins the discover process within domain 2. Advantageously, SAS initiator A 102A of RAID controller A 112A does not receive a BROADCAST (CHANGE) primitive and therefore does not perform a discover process.

Figure 6:
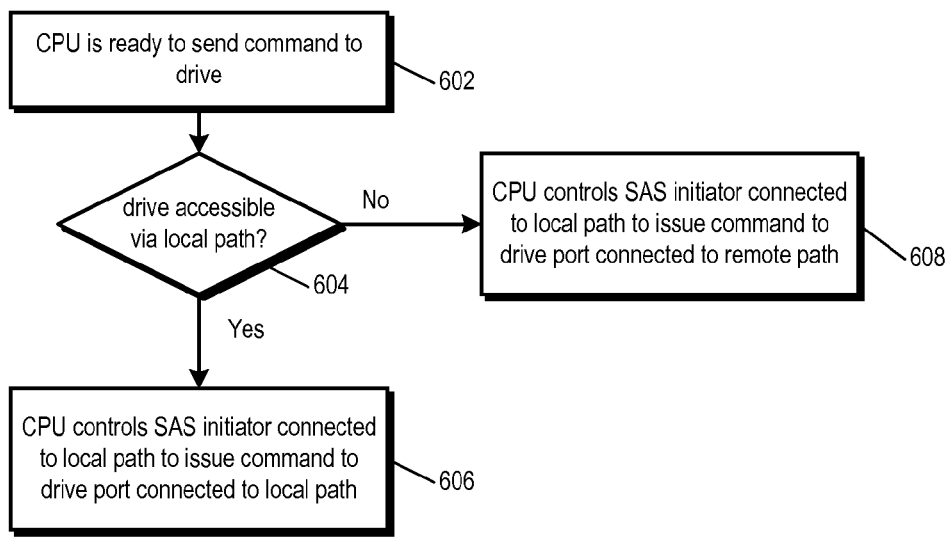
FIG. 6 is a flowchart illustrating operation of the system of FIG. 1 according to the present invention.

Referring now to FIG. 6, a flowchart illustrating operation of the system 100 of FIG. 1 according to the present invention is shown. In particular, the flowchart illustrates how the CPU 114 of a RAID controller 112 of FIG. 1 determines which of the two SAS initiators 102 to use to send a command to a disk drive 106/124. Flow begins at block 602.

At block 602, the CPU 114 is ready to send a command to a disk drive 106/124. Typically, this will be in response to an I/O request from a host computer to write or read user data. The I/O request to a disk array, or logical drive, may be broken down into multiple constituent commands to individual physical disk drives 106/124 of the array. Additionally, the RAID controller 112 may internally generate commands that need to be sent to a disk drive 106/124, such as a command needed to perform configuration or management operations. Flow proceeds to decision block 604.

At decision block 604, the CPU 114 determines whether the destination disk drive 106/124 is accessible via the local path. In one embodiment, the destination disk drive 106/124 is accessible via the local path if the SAS initiator 102 in the domain of the local path has been able to discover the destination disk drive 106/124 via a SAS discover process in response to the most recent change event notification, and has been able to successfully complete commands to the drive to determine the type and capacity of the drive (such as SCSI INQUIRY and READ CAPACITY commands). As mentioned above, each link reset prompts a SAS discover process, and during the SAS discovery process the RAID controller 112 considers the destination disk drive 106/124 inaccessible. In one embodiment, if the number of SAS discover processes that have been performed within a predetermined period is greater than a predetermined threshold, the RAID controller 112 considers the disk drives 106/124 in the domain inaccessible. In one embodiment, the RAID controller 112, rather than considering all disk drives 106/124 in the domain inaccessible, may consider some disk drives 106/124 accessible and some disk drives 106/124 inaccessible depending upon the source of the domain change events. In one embodiment, the SAS expanders 102/124 in the system 100 may intelligently isolate faulty components, such as faulty PHYs, to enable the remainder of the domain to continue functioning. Such an embodiment is described in U.S. patent application Ser. No. 11/552,140 (DH.0137), filed Oct. 23, 2006, which is hereby incorporated herein by reference for all purposes. In one embodiment, the SAS expanders 102/124 in the system 100 may intelligently adaptively configure the analog settings of PHYs to enable the remainder of the domain to continue functioning, for example in order to adjust for varying cable lengths within the system 100. Such an embodiment is described in U.S. patent application Ser. No. 11/847,229 (DH.0141), filed Aug. 29, 2007, which is hereby incorporated herein by reference for all purposes. If the destination disk drive 106/124 is accessible via the local path, flow proceeds to block 606; otherwise, flow proceeds to block 608.

At block 606, the CPU 114 posts an I/O request to control the SAS initiator 102 connected to the local path to issue the command to the destination disk drive 106/124 port connected to the local path. For RAID controller A 112A, port A of each of the disk drives 106/124 in the system 100 is connected to the local path; for RAID controller B 112B, port B of each of the disk drives 106/124 in the system 100 is connected to the local path. For RAID controller A 112A, SAS initiator A 102A is connected to the local path to disk drives A 106A and to the disk drives 124 of expansion chassis B 128B; whereas, SAS initiator B 102B is connected to the local path to disk drives B 106B and to the disk drives 124 of expansion chassis A 128A. In contrast, for RAID controller B 112B, SAS initiator B 102B is connected to the local path to disk drives A 106A and to the disk drives 124 of expansion chassis B 128B; whereas, SAS initiator A 102A is connected to the local path to disk drives B 106B and to the disk drives 124 of expansion chassis A 128A. The CPU 114 creates the I/O request such that it specifies the SAS address of the destination disk drive 106/124 local port. In response to the I/O request, the SAS initiator 102 transmits the command to the zoned SAS expander 104. An entry for the disk's local port SAS address should be present in the zoned SAS expander 104 route table with a zone group valid bit set to 1 and the zone group field set to zone group 1 if the local path is in domain 1 and set to zone group 2 if the local path is in zone group 2. The entry in the route table also indicates which port of the zoned SAS expander 104 is used to forward connection requests to the destination disk drive 106/124 port having the specified SAS address. Consequently, the zoned SAS expander 104 transmits the frames associated with the command out the indicated port, which is in the path to the destination disk drive's local port. Thus, the destination disk drive 106/124 port either receives the frames directly from the zoned SAS expander 104 port or indirectly from it via a SAS expander 126 in the expansion chassis 128. Flow ends at block 606.

At block 608, the CPU 114 posts an I/O request to control the SAS initiator 102 connected to the remote path to issue the command to the destination disk drive 106/124 port connected to the remote path. For RAID controller A 112A, port B of each of the disk drives 106/124 in the system 100 is connected to the remote path; for RAID controller B 112B, port A of each of the disk drives 106/124 in the system 100 is connected to the remote path. For RAID controller A 112A, SAS initiator B 102B is connected to the remote path to disk drives A 106A and to the disk drives 124 of expansion chassis B 128B; whereas, SAS initiator A 102A is connected to the remote path to disk drives B 106B and to the disk drives 124 of expansion chassis A 128A. In contrast, for RAID controller B 112B, SAS initiator A 102A is connected to the remote path to disk drives A 106A and to the disk drives 124 of expansion chassis B 128B; whereas, SAS initiator B 102B is connected to the remote path to disk drives B 106B and to the disk drives 124 of expansion chassis A 128A. The CPU 114 creates the I/O request such that it specifies the SAS address of the destination disk drive 106/124 remote port. In response to the I/O request, the SAS initiator 102 transmits the command to the zoned SAS expander 104. An entry for the disk's remote port SAS address should be absent from the zoned SAS expander 104 route table. Consequently, the zoned SAS expander 104 transmits the frames associated with the command out the subtractive routing port, which is coupled to the inter-controller link 108 such that the frames are received by the zoned SAS expander 104 on the other RAID controller 112. An entry for the disk's remote port SAS address should be present in the other RAID controller's zoned SAS expander 104 route table with a zone group valid bit set to 1 and the zone group field set to zone group 1 if the remote path is in domain 1 and set to zone group 2 if the remote path is in zone group 2. The entry in the route table also indicates which port of the zoned SAS expander 104 is used to forward connection requests to the destination disk drive 106/124 port having the specified SAS address. Consequently, the zoned SAS expander 104 transmits the frames associated with the command out the indicated port, which is in the path to the destination disk drive's remote port. Thus, the destination disk drive 106/124 port either receives the frames directly from the other RAID controller's zoned SAS expander 104 or indirectly from it via a SAS expander 126 in the expansion chassis 128. Flow ends at block 608.

Figure 7:
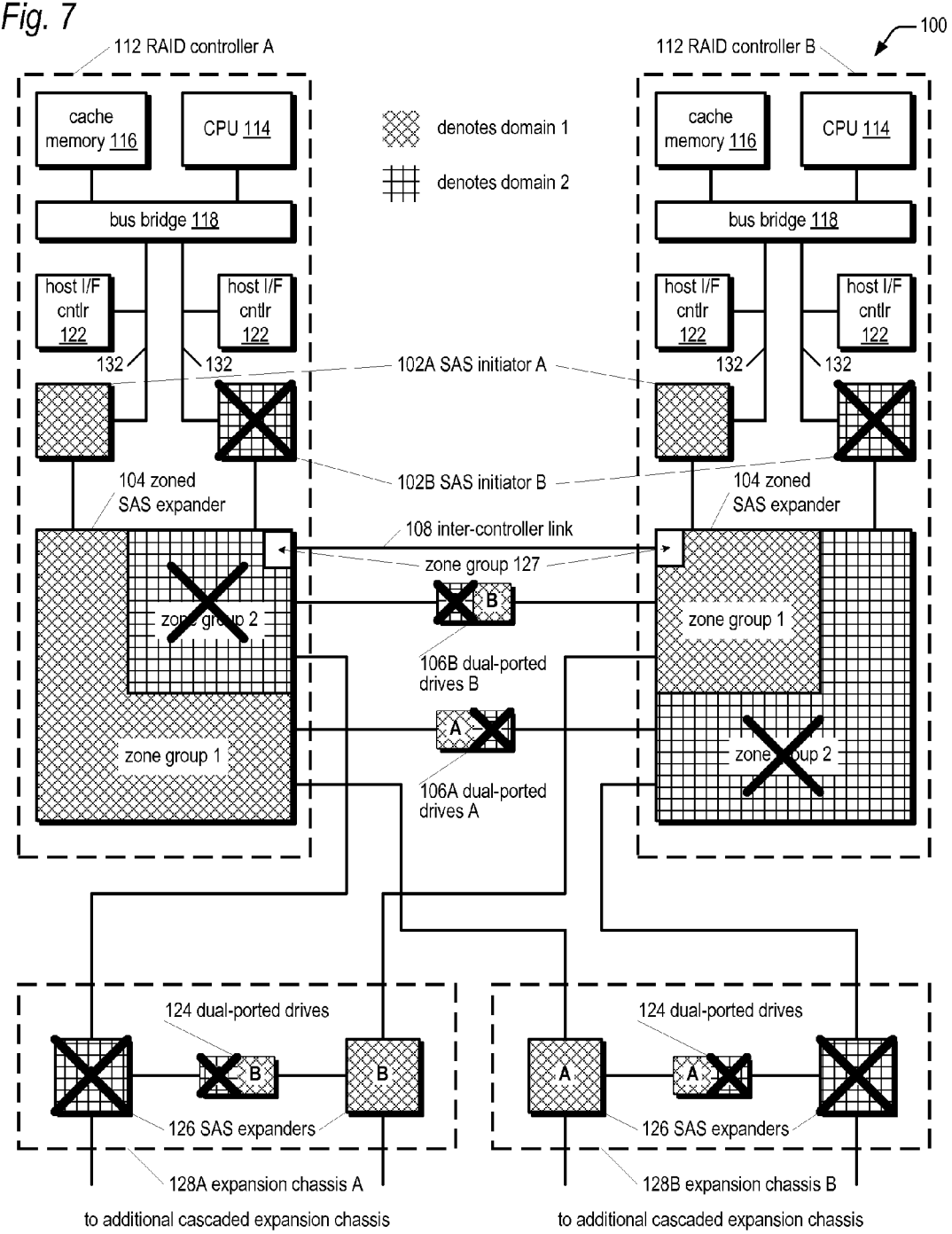
FIG. 7 is a block diagram illustrating operation of the system of FIG. 1 in a state in which domain 2 is non-functional according to the present invention.

Referring now to FIG. 7, a block diagram illustrating operation of the system 100 of FIG. 1 in a state in which domain 2 is non-functional according to the present invention is shown. According to the operation of system 100 described with respect to the flowchart of FIG. 6, because domain 2 is non-functional, RAID controller A 112A will send commands to the disk drives A 106A and the disk drives 124 in expansion chassis B 128B through SAS initiator A 102A via the local path, and will send commands to the disk drives B 106B and the disk drives 124 in expansion chassis A 128A through SAS initiator A 102A via the remote path. Furthermore, RAID controller B 112B will send commands to the disk drives B 106B and the disk drives 124 in expansion chassis A 128A through SAS initiator A 102A via the local path, and will send commands to the disk drives A 106A and the disk drives 124 in expansion chassis B 128B through SAS initiator A 102A via the remote path. Although FIG. 7 illustrates operation of the system 100 via an example in which domain 2 is non-functional, it should be understood that the system 100 operates in a similar manner to provide access to the disk drives 106/124 via SAS initiator B 102B of the RAID controllers 112 if domain 1 is non-functional.

Figure 8:
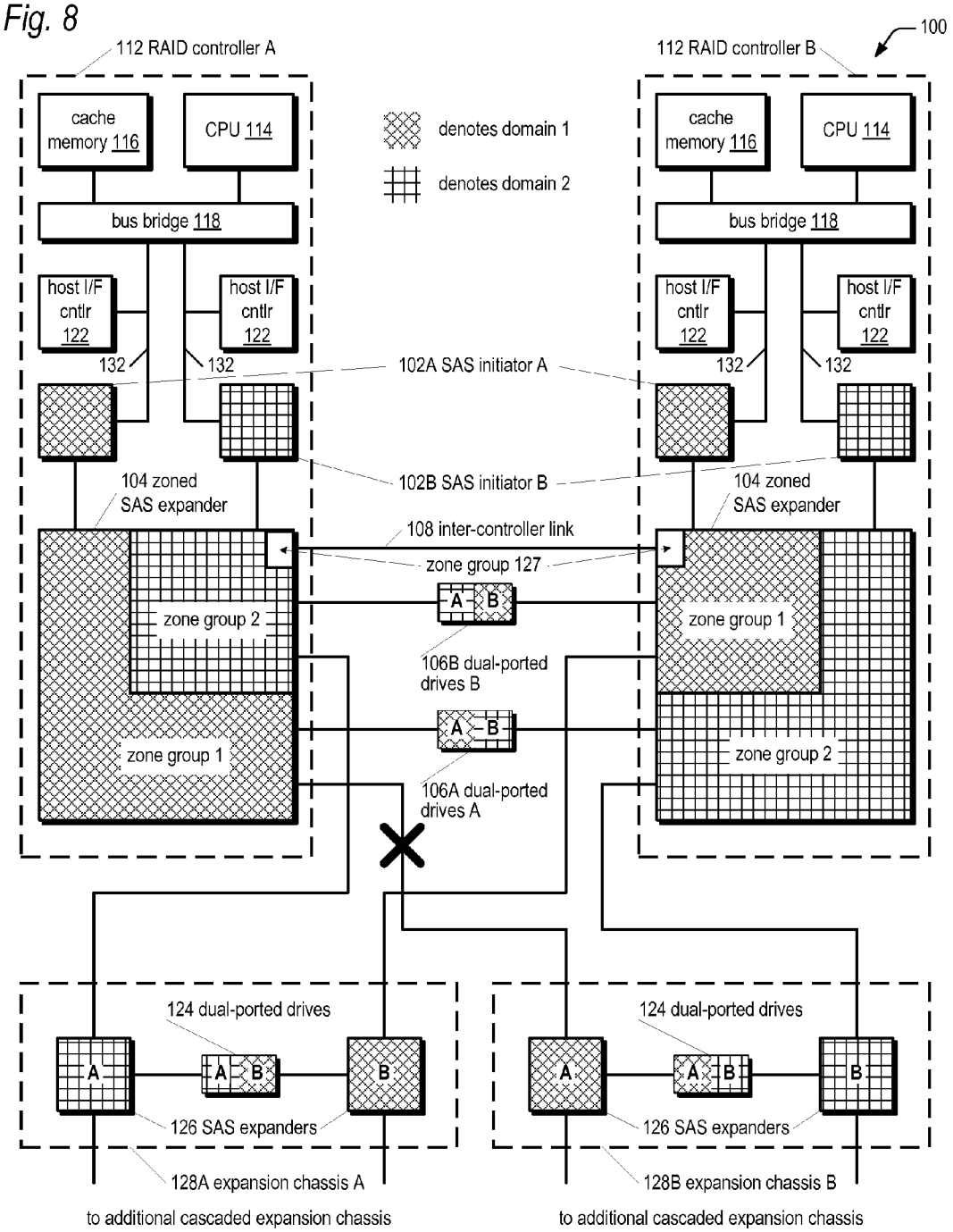
FIG. 8 is a block diagram illustrating operation of the system of FIG. 1 in a state in which a cable from RAID controller A 112A to expansion chassis B 128B is failed according to the present invention.

Referring now to FIG. 8, a block diagram illustrating operation of the system 100 of FIG. 1 in a state in which a cable from RAID controller A 112A to expansion chassis B 128B is failed according to the present invention is shown. According to the operation of system 100 described with respect to the flowchart of FIG. 6, because cable from RAID controller A 112A to expansion chassis B 128B is failed, RAID controller A 112A accesses the disk drives 124 in expansion chassis B 128B through SAS initiator B 102B via the remote path to the disk drives 124 in expansion chassis B 128B. Although FIG. 8 illustrates operation of the system 100 via an example in which a cable from RAID controller A 112A to expansion chassis B 128B is failed, it should be understood that the system 100 operates in a similar manner to provide access to the disk drives 106/124 via the remote path other single point failures occur.

Figure 9:
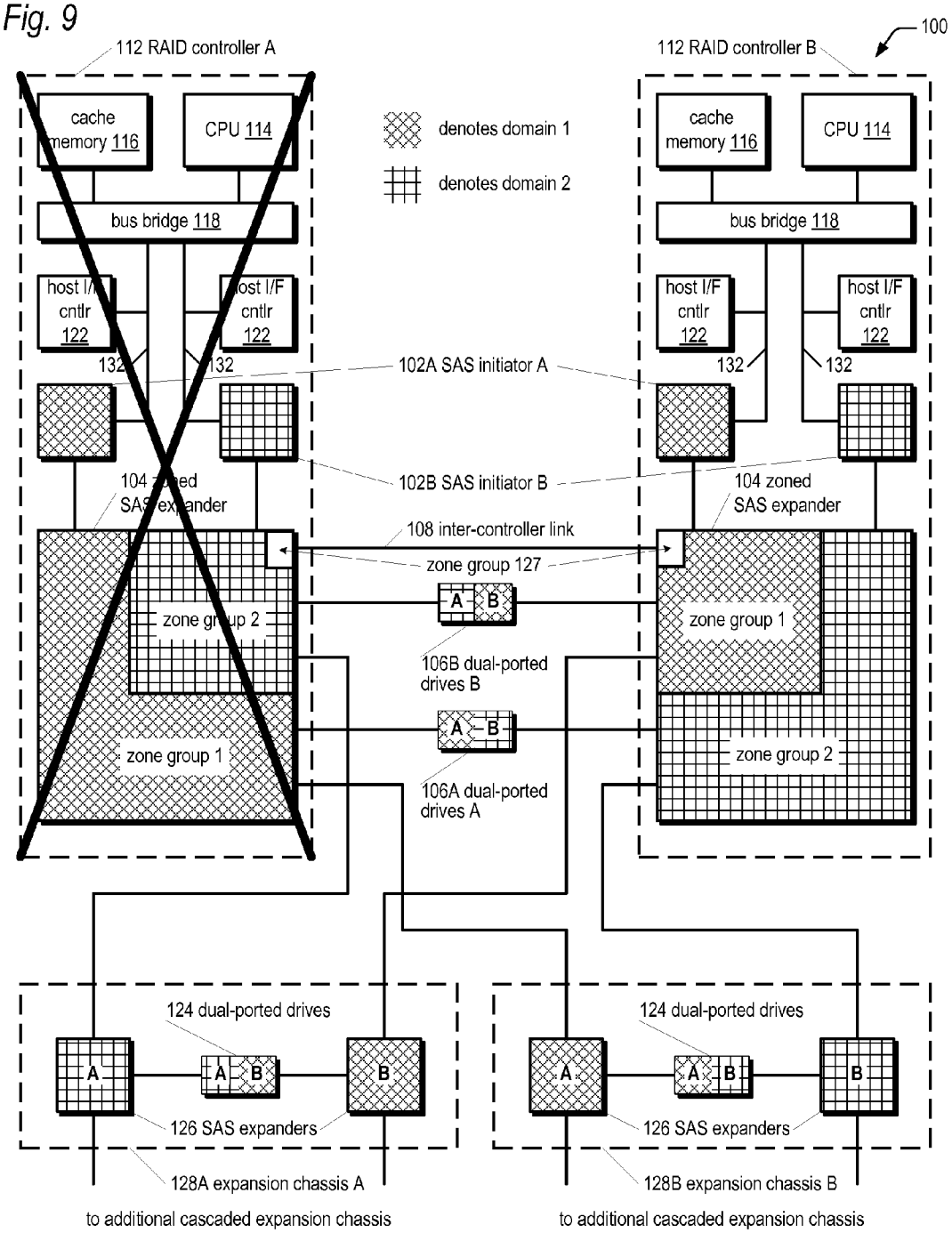
FIG. 9 is a block diagram illustrating operation of the system of FIG. 1 in a state in which RAID controller A 112A has failed according to the present invention.

Referring now to FIG. 9, a block diagram illustrating operation of the system 100 of FIG. 1 in a state in which RAID controller A 112A has failed according to the present invention is shown. According to the operation of system 100 described with respect to the flowchart of FIG. 6, because RAID controller A 112A has failed, the system 100 can continue to make the data on the disk drives 106/124 available through RAID controller B 112B because RAID controller B 112B can continue to access all of the disk drives 106/124 in the system 100 via its local path to them. Although FIG. 9 illustrates operation of the system 100 via an example in which RAID controller A 112A has failed, it should be understood that the system 100 operates in a similar manner to continue to make the data on the disk drives 106/124 available through RAID controller A 112A if RAID controller B 112B has failed.

As may be observed from the forgoing, the embodiments of the present invention described herein enjoy all of the following advantages, among others, over conventional systems. First, the embodiments avoid loss of data availability to the host computers if various single point failures occur, including but not limited to a SAS cable or connector failing or intermittently failing, since each RAID controller has at least two paths to each disk drive in the system. Second, performance may be improved over the conventional RAID controllers because the two SAS initiators collectively potentially provide up to approximately twice the bandwidth between the SAS system and the cache memory subsystem over a single SAS initiator RAID controller due to the fact that two local buses, rather than one, are configured to convey the data from the SAS subsystem to the cache memory. Third, the embodiments create two distinct SAS domains, which: 1) avoids the loss of data availability even if an entire single domain becomes effectively non-functional; 2) potentially allows a larger number of disk drives to be accessible by the SAS address table-limited SAS initiators because each SAS initiator sees only one port of each drive in the system, rather than two; 3) allows failover and failback without requiring reconfiguration of the SAS expanders; and 4) creates a dual-branch disk drive expansion chassis structure which is less complex and more robust than the conventional systems.

Although the present invention and its objects, features, and advantages have been described in detail, other embodiments are encompassed by the invention. For example, although embodiments have been described in which the ports coupled to the inter-controller link are subtractive routed ports, other embodiments are contemplated in which these ports are table routed and the SAS address of the disk drive port that is in the SAS domain of the remote path is included in an entry of the zoned SAS expander route table that indicates the port coupled to the inter-controller link. Additionally, although the embodiments described herein are able to continue to provide data availability in the presence of certain failure modes described herein, the embodiments advantageously may continue to provide data availability in the presence of certain other failure modes not described herein.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A system, comprising:
   first and second redundant array of inexpensive disks (RAID) controllers, configured in an active-active failover redundant manner, each comprising:
   first and second Serial Attached SCSI (SAS) initiator devices; and
   a SAS expander, coupled to said first and second SAS initiator devices, configured to have first, second, and third zone groups;
   wherein with respect to said SAS expander of said first RAID controller, said first zone group includes PHYs linked to said first initiator device and PHYs configured to link to a first port of a first plurality of disk drives, wherein said second zone group includes PHYs linked to said second initiator device and PHYs configured to link to a first port of a second plurality of disk drives, and said third zone group includes PHYs linked to said SAS expander of said second RAID controller;
   wherein with respect to said SAS expander of said second RAID controller, said first zone group includes PHYs linked to said first initiator device and PHYs configured to link to a second port of said second plurality of disk drives, wherein said second zone group includes PHYs linked to said second initiator device and PHYs configured to link to a second port of said first plurality of disk drives, and said third zone group includes PHYs linked to said SAS expander of said first RAID controller;
   wherein said SAS expanders are collectively configured to permit PHYs in said first zone group to access PHYs in said first and third zone groups but to exclude PHYs in said first zone group from accessing PHYs in said second zone group, to permit PHYs in said second zone group to access PHYs in said second and third zone groups but to exclude PHYs in said second zone group from accessing PHYs in said first zone group, and to permit PHYs in said third zone group to access PHYs in said first, second, and third zone groups;
   wherein accordingly within the system a first SAS domain is created that includes said first initiator device of said first and second RAID controllers, said first port of said first plurality of disk drives, and said second port of said second plurality of disk drives, but excludes said second initiator device of said first and second RAID controllers, said first port of said second plurality of disk drives, and said second port of said first plurality of disk drives;
   wherein accordingly within the system a second SAS domain is created that includes said second initiator device of said first and second RAID controllers, said first port of said second plurality of disk drives, and said second port of said first plurality of disk drives, but excludes said first initiator device of said first and second RAID controllers, said first port of said first plurality of disk drives, and said second port of said second plurality of disk drives.

2. The system of claim 1, wherein said first RAID controller is configured to control said first initiator device rather than said second initiator device to issue commands to said first plurality of disk drives and to control said second initiator device rather than said first initiator device to issue commands to said second plurality of disk drives under normal conditions, wherein said second RAID controller is configured to control said first initiator device rather than said second initiator device to issue commands to said second plurality of disk drives and to control said second initiator device rather than said first initiator device to issue commands to said first plurality of disk drives under normal conditions.

3. The system of claim 2, wherein each of said first and second RAID controllers further comprises:
   a microprocessor, coupled to said first and second SAS initiator devices, configured to control said first and second initiator devices to issue commands to said first and second plurality of disk drives.

4. The system of claim 2, wherein said first RAID controller is configured to control said second initiator device rather than said first initiator device to issue commands to one of said first plurality of disk drives when said one of said first plurality of disk drives is inaccessible via a local SAS path to said one of said first plurality of disk drives, wherein said local SAS path excludes links to said SAS expander of said second RAID controller.

5. The system of claim 4, wherein said first RAID controller is configured to control said second initiator device rather than said first initiator device to issue commands to said second port of said one of said first plurality of disk drives when said one of said first plurality of disk drives is inaccessible via said local SAS path.

6. The system of claim 2, wherein said first RAID controller is configured to control said first initiator device rather than said second initiator device to issue commands to said first plurality of disk drives and to control said second initiator device rather than said first initiator device to issue commands to said second plurality of disk drives when said second RAID controller fails, wherein said second RAID controller is configured to control said first initiator device rather than said second initiator device to issue commands to said second plurality of disk drives and to control said second initiator device rather than said first initiator device to issue commands to said first plurality of disk drives when said first RAID controller fails.

7. The system of claim 1, wherein each of said SAS expanders is configured such that a SAS port comprising said PHYs included in said third zone group is the subtractive routing port of said SAS expander.

8. The system of claim 1, further comprising:
an inter-controller SAS link, coupling a first SAS port comprising said PHYs included in said third zone group of said SAS expander of said first RAID controller to a second SAS port comprising said PHYs included in said third zone group of said SAS expander of said second RAID controller.

9. The system of claim 8, wherein said SAS expanders are configured to enable:
said first SAS initiator device of said first RAID controller to access said first plurality of disk drives via a first SAS path excluding said inter-controller SAS link and to access said second plurality of disk drives via a second SAS path including said inter-controller SAS link;
said second SAS initiator device of said first RAID controller to access said first plurality of disk drives via a third SAS path including said inter-controller SAS link and to access said second plurality of disk drives via a fourth SAS path excluding said inter-controller SAS link;
said first SAS initiator device of said second RAID controller to access said first plurality of disk drives via a fifth SAS path including said inter-controller SAS link and to access said second plurality of disk drives via a sixth SAS path excluding said inter-controller SAS link;
said second SAS initiator device of said second RAID controller to access said first plurality of disk drives via a seventh SAS path excluding said inter-controller SAS link and to access said second plurality of disk drives via a eighth SAS path including said inter-controller SAS link.

10. The system of claim 1,
wherein said first zone group of said SAS expander of said first RAID controller further includes PHYs configured to link to a first SAS expander in a first expansion chassis configured to enclose a third plurality of disk drives each having a first port linked to said first expander of said first expansion chassis;
wherein said second zone group of said SAS expander of said first RAID controller further includes PHYs configured to link to a first SAS expander in a second expansion chassis configured to enclose a fourth plurality of disk drives each having a first port linked to said first expander of said second expansion chassis;
wherein said first zone group of said SAS expander of said second RAID controller further includes PHYs configured to link to a second expander in said second expansion chassis configured to enclose said fourth plurality of disk drives each having a second port linked to said second expander of said second expansion chassis;
wherein said second zone group of said SAS expander of said second RAID controller further includes PHYs configured to link to a second expander in said first expansion chassis configured to enclose said third plurality of disk drives each having a second port linked to said second expander of said first expansion chassis;
wherein said first SAS domain further includes PHYs of said first expander of said first expansion chassis, PHYs of said second expander of said second expansion chassis, said first port of each of said third plurality of disk drives, and said second port of each of said fourth plurality of disk drives, but excludes PHYs of said second expander of said first expansion chassis, PHYs of said first expander of said second expansion chassis, said second port of each of said third plurality of disk drives, and said first port of each of said fourth plurality of disk drives;
wherein said second SAS domain further includes PHYs of said second expander of said first expansion chassis, PHYs of said first expander of said second expansion chassis, said second port of each of said third plurality of disk drives, and said first port of each of said fourth plurality of disk drives, but excludes PHYs of said first expander of said first expansion chassis, PHYs of said second expander of said second expansion chassis, said first port of each of said third plurality of disk drives, and said second port of each of said fourth plurality of disk drives.

11. The system of claim 10, wherein said first RAID controller is configured to control said first initiator device rather than said second initiator device to issue commands to said third plurality of disk drives and to control said second initiator device rather than said first initiator device to issue commands to said fourth plurality of disk drives under normal conditions, wherein said second RAID controller is configured to control said first initiator device rather than said second initiator device to issue commands to said fourth plurality of disk drives and to control said second initiator device rather than said first initiator device to issue commands to said third plurality of disk drives under normal conditions.

12. The system of claim 11, wherein said first RAID controller is configured to control said first initiator device rather than said second initiator device to issue commands to said fourth plurality of disk drives when said fourth plurality of disk drives is inaccessible via a local SAS path to said fourth plurality of disk drives, wherein said local SAS path excludes links to said SAS expander of said second RAID controller.

13. The system of claim 12, wherein said first RAID controller is configured to control said first initiator device rather than said second initiator device to issue commands to said second port of said fourth plurality of disk drives when said fourth plurality of disk drives is inaccessible via said local SAS path.

14. The system of claim 1, wherein each of said first and second RAID controllers further comprises:
a cache memory, operationally coupled to each of said first and second SAS initiator devices, configured to cache data between said first and second plurality of disk drives and host computers coupled to said RAID controller.

15. The system of claim 1, wherein said SAS expanders of said first and second RAID controllers comprise a single zoned portion of a SAS delivery subsystem (ZPSDS).

16. The system of claim 1, wherein each of said SAS expanders are configured to transmit a SAS BROADCAST (Change) primitive to its respectively coupled said first SAS initiator device in response to a SAS port of said SAS expander detecting a domain change event only when said SAS port is in said first SAS domain, and to transmit a SAS BROADCAST (Change) primitive to its respectively coupled said second SAS initiator device in response to a SAS port of said coupled SAS expander detecting a domain change event only when said SAS port is in said second SAS domain.

17. The system of claim 1, wherein said SAS expanders are configured such that each of said SAS initiator devices of the system discovers one and only one of said first and second ports of each of said first and second plurality of disk drives.

18. A method for configuring a system having first and second redundant array of inexpensive disks (RAID) controllers to operate in an active-active manner, the method comprising:
configuring each of the first and second RAID controllers to include first and second Serial Attached SCSI (SAS) initiator devices, and a SAS expander coupled to said first and second SAS initiator devices; and
configuring said SAS expanders to have first, second, and third zone groups, wherein with respect to said SAS expander of said first RAID controller, said first zone group includes PHYs linked to said first initiator device and PHYs configured to link to a first port of a first plurality of disk drives, wherein said second zone group includes PHYs linked to said second initiator device and PHYs configured to link to a first port of a second plurality of disk drives, and said third zone group includes PHYs linked to said SAS expander of said second RAID controller, wherein with respect to said SAS expander of said second RAID controller, said first zone group includes PHYs linked to said first initiator device and PHYs configured to link to a second port of said second plurality of disk drives, wherein said second zone group includes PHYs linked to said second initiator device and PHYs configured to link to a second port of said first plurality of disk drives, and said third zone group includes PHYs linked to said SAS expander of said first RAID controller;
collectively configuring said SAS expanders to permit PHYs in said first zone group to access PHYs in said first and third zone groups but to exclude PHYs in said first zone group from accessing PHYs in said second zone group, to permit PHYs in said second zone group to access PHYs in said second and third zone groups but to exclude PHYs in said second zone group from accessing PHYs in said first zone group, and to permit PHYs in said third zone group to access PHYs in said first, second, and third zone groups;
creating within the system a first SAS domain that includes said first initiator device of said first and second RAID controllers, said first port of said first plurality of disk drives, and said second port of said second plurality of disk drives, but excludes said second initiator device of said first and second RAID controllers, said first port of said second plurality of disk drives, and said second port of said first plurality of disk drives; and
creating within the system a second SAS domain that includes said second initiator device of said first and second RAID controllers, said first port of said second plurality of disk drives, and said second port of said first plurality of disk drives, but excludes said first initiator device of said first and second RAID controllers, said first port of said first plurality of disk drives, and said second port of said second plurality of disk drives.

19. The method of claim 18, further comprising:
configuring said first RAID controller to control said first initiator device rather than said second initiator device to issue commands to said first plurality of disk drives and to control said second initiator device rather than said first initiator device to issue commands to said second plurality of disk drives under normal conditions; and
configuring said second RAID controller to control said first initiator device rather than said second initiator device to issue commands to said second plurality of disk drives and to control said second initiator device rather than said first initiator device to issue commands to said first plurality of disk drives under normal conditions.

20. The method of claim 19, further comprising:
configuring said first RAID controller to control said second initiator device rather than said first initiator device to issue commands to one of said first plurality of disk drives when said one of said first plurality of disk drives is inaccessible via a local SAS path to said one of said first plurality of disk drives, wherein said local SAS path excludes links to said SAS expander of said second RAID controller.

21. The method of claim 18, further comprising:
configuring said SAS expanders to transmit a SAS BROADCAST (Change) primitive to its respectively coupled said first SAS initiator device in response to a SAS port of said coupled SAS expander detecting a domain change event only when said SAS port is in said first SAS domain, and to transmit a SAS BROADCAST (Change) primitive to its respectively coupled said second SAS initiator device in response to a SAS port of said coupled SAS expander detecting a domain change event only when said SAS port is in said second SAS domain.

22. The system of claim 1, further comprising:
configuring said SAS expanders such that each of said SAS initiator devices of the system discovers one and only one of said first or second ports of each of said first and second plurality of disk drives.

23. A system, comprising:
a first redundant array of inexpensive disks (RAID) controller, comprising:
a Serial Attached SCSI (SAS) expander;
a first SAS initiator device, coupled to said SAS expander, configured to access a first respective port of a first plurality of disk drives exclusively via a first respective plurality of local SAS paths, and to access a first respective port of a second plurality of disk drives exclusively via a first respective plurality of remote SAS paths; and
a second SAS initiator device, coupled to said SAS expander, configured to access a second respective port of said second plurality of disk drives exclusively via a second respective plurality of local SAS paths, and to access a second respective port of said first plurality of disk drives exclusively via a second respective plurality of remote SAS paths; and
a second RAID controller, comprising:
a SAS expander;
a first SAS initiator device, coupled to said SAS expander, configured to access said first respective port of said second plurality of disk drives exclusively via a third respective plurality of local SAS paths, and to access said first respective port of said first plurality of disk drives exclusively via a third respective plurality of remote SAS paths; and a second SAS initiator device, coupled to said SAS expander, configured to access said second respective port of said first plurality of disk drives exclusively via a fourth respective plurality of local SAS paths, and to access said second respective port of said second plurality of disk drives exclusively via a fourth respective plurality of remote SAS paths; and a SAS link, linking said SAS expander of said first RAID controller to said SAS expander of said second RAID controller, wherein each of said first, second, third, and fourth pluralities of local SAS paths excludes said SAS link, wherein each of said first, second, third, and fourth pluralities of remote SAS paths includes said SAS link;

wherein said SAS expanders are configured in conjunction with one another as a single zoned portion of a SAS delivery subsystem (ZPSDS) that creates first and second SAS domains;

wherein said first SAS domain includes and said second SAS domain excludes ports of said first SAS initiator devices and said first respective port of said first and second plurality of disk drives;

wherein said second SAS domain includes and said first SAS domain excludes ports of said second SAS initiator devices and said second respective port of said first and second plurality of disk drives.

24. The system of claim 23, wherein said SAS expanders are configured to have first, second, and third zone groups, wherein said first zone group includes PHYs linked to said ports included in said first SAS domain, wherein said second zone group includes PHYs linked to said ports included in said second SAS domain, and said third zone group includes PHYs coupled to said SAS link.

25. The system of claim 24, wherein said SAS expanders are collectively configured to permit PHYs in said first zone group to access PHYs in said first and third zone groups but to exclude PHYs in said first zone group from accessing PHYs in said second zone group, to permit PHYs in said second zone group to access PHYs in said second and third zone groups but to exclude PHYs in said second zone group from accessing PHYs in said first zone group, and to permit PHYs in said third zone group to access PHYs in said first, second, and third zone groups.

* * * * *